US011352000B2

(12) United States Patent
Aso

(10) Patent No.: US 11,352,000 B2
(45) Date of Patent: Jun. 7, 2022

(54) VEHICLE CONTROL APPARATUS

(71) Applicant: TOYOTA JIDOSHA KABUSHIKI KAISHA, Toyota (JP)

(72) Inventor: Kazuaki Aso, Gotemba (JP)

(73) Assignee: TOYOTA JTDOSHA KABUSHIKI KATSHA, Toyota (JP)

( * ) Notice: Subject to any disclaimer, the term of this patent is extended or adjusted under 35 U.S.C. 154(b) by 285 days.

(21) Appl. No.: 15/954,886

(22) Filed: Apr. 17, 2018

(65) Prior Publication Data
US 2018/0345966 A1    Dec. 6, 2018

(30) Foreign Application Priority Data

May 31, 2017   (JP) .............................. JP2017-107751

(51) Int. Cl.
  *B60W 30/14*    (2006.01)
  *G01C 21/34*    (2006.01)
(52) U.S. Cl.
  CPC ....... *B60W 30/143* (2013.01); *G01C 21/3407* (2013.01); *B60W 2552/30* (2020.02); *B60W 2720/10* (2013.01)
(58) Field of Classification Search
  CPC ........... B60W 30/143; B60W 2550/14; B60W 2720/10; B60W 2552/30; B60K 31/02; G01C 21/26; G01C 21/3407
  See application file for complete search history.

(56) References Cited

U.S. PATENT DOCUMENTS

| 6,208,927 | B1* | 3/2001 | Mine ................. | B60K 31/0083 |
| | | | | 701/70 |
| 2004/0111209 | A1 | 6/2004 | Kagawa et al. | |
| 2013/0332044 | A1 | 12/2013 | Um et al. | |
| 2017/0261989 | A1* | 9/2017 | Ishioka ................. | G01C 21/34 |
| 2018/0011494 | A1* | 1/2018 | Zhu ....................... | G05D 1/0221 |

FOREIGN PATENT DOCUMENTS

| JP | H08194894 A | * | 7/1996 | |
| JP | 2003-048450 A | | 2/2003 | |
| JP | 2004-175148 A | | 6/2004 | |
| JP | 2013-257856 A | | 12/2013 | |
| JP | 2014-118000 A | | 6/2014 | |
| WO | WO-2018015811 A1 | * | 1/2018 | ............. G01C 21/28 |

* cited by examiner

*Primary Examiner* — Jeffrey C Boomer
*Assistant Examiner* — Annmarie Dressler
(74) *Attorney, Agent, or Firm* — Sughrue Mion, PLLC

(57) ABSTRACT

A vehicle control apparatus comprising a navigation system and a control unit, wherein the navigation system includes a map database, a position acquisition unit, a route determination unit, and an output unit configured to output road information on a plurality of locations from a position of the vehicle to a location at a predetermined distance ahead on the target route, wherein the control unit includes a buffer unit configured to store the road information as the road information on a first distance interval, and a controller unit configured to control the speed of the vehicle, wherein the output unit is configured to, in response to changing the target route, thin out the road information such that the number of data becomes less than that of the road information on the first distance interval, and wherein the buffer unit is configured to store the thinned-out road information.

4 Claims, 9 Drawing Sheets

VEHICLE CONTROL APPARATUS

CROSS-REFERENCE TO RELATED APPLICATION

This application is based on Japanese Patent Application No. 2017-107751 filed with Japan Patent Office on May 31, 2017, the entire contents of which are hereby incorporated by reference.

TECHNICAL FIELD

The present disclosure relates to a vehicle control apparatus.

BACKGROUND

Japanese Unexamined Patent Publication No. 2003-048450 discloses a vehicle equipped with a navigation system and a vehicle control apparatus. The navigation system detects a current position of the vehicle using a global positioning system (GPS) and acquires road information (a curvature or the like) ahead of the vehicle based on the detected current position and map information stored and held in advance. The navigation system outputs the acquired road information to the vehicle control apparatus. The vehicle control apparatus controls a speed of the vehicle based on the acquired road information.

SUMMARY

Incidentally, in order to accurately control the speed of the vehicle in accordance with a road environment, it is conceivable to increase the volume of the input information. That is, it is conceivable that the vehicle control apparatus calculates the speed of the vehicle using the road information of a plurality of positions on the target route ahead of the vehicle. In this case, the vehicle control apparatus needs to acquire the road information of a plurality of positions on the target route ahead of the vehicle before starting the calculation of the speed of the vehicle.

The vehicle control apparatus is generally connected to the navigation system via an in-vehicle network. The information volume output from the navigation system to the vehicle control apparatus depends on a communication capacity of the in-vehicle network. The navigation system needs to perform communication by dividing the information volume of the road information on the plurality of positions multiple times when the information volume of the road information on the plurality of positions exceeds the limited communication volume. The plurality of communications, however, causes a delay of the acquisition of the road information necessary for calculating the speed of the vehicle.

In order to avoid such a delay, it is conceivable that the vehicle control apparatus buffers a part or all of the road information obtained in the previous communication processing in a storage unit of the vehicle control apparatus. However, even if the road information are buffered in the storage unit, for example, when the target route of the vehicle is changed by a lane change or the like, the vehicle control apparatus cannot use the road information buffered in advance. In this case, it is necessary to acquire the road information again via the communication. Therefore, when the target route of the vehicle is changed, the vehicle control apparatus may not be able to accurately control the speed of the vehicle in accordance with the road environment.

In the present technical field, it is desired to provide a vehicle control apparatus that can accurately control the speed of the vehicle in accordance with the road environment even if the target route of the vehicle is changed.

An aspect of the present disclosure provides a vehicle control apparatus configured to control a speed of a vehicle traveling along a target route. The apparatus includes a navigation system and a control unit configured to be communicably connected to the navigation system. The navigation system is configured to include a map database including road information, a position acquisition unit configured to acquire the position of the vehicle on the map, a route determination unit configured to determine a target route of the vehicle based on the road information and the position of the vehicle on the map acquired by the position acquisition unit, and an output unit configured to output to the control unit via the communication the road information on a plurality of locations from the position of the vehicle on the map acquired by the position acquisition unit to a location at a predetermined distance ahead on the target route. The control unit is configured to include a buffer unit configured to acquire the road information output by the output unit of the navigation system via the communication and store the information in the storage unit as the road information on the first distance interval, and a controller unit configured to control the speed of the vehicle based on the information stored in the storage unit. The output unit is configured to, in response to changing the target route of the vehicle, thin out the road information on a plurality of locations from the position of the vehicle on the map acquired by the position acquisition unit to a location at the predetermined distance ahead on the changed target route such that the number of data becomes less than that of the road information on the first distance interval and output the thinned-out road information. The buffer unit is configured to, in response to acquiring the thinned-out road information, erase the storage contents stored in the storage unit and stores the thinned-out road information in the storage unit.

In the apparatus, when the target route of the vehicle is changed, the road information on the plurality of locations from the position of the vehicle on the map to the location at the predetermined distance ahead on the changed target route are thinned out such that the number of data becomes less than that of the road information on the first distance interval and the result is output by the output unit. That is, the vehicle control apparatus can quickly acquire the road information after the change of the target route by reducing the communication volume for the transmission when the target route is changed. Accordingly, even if the target route of the vehicle is changed, the vehicle control apparatus can accurately control the speed of the vehicle in accordance with the road environment.

In the embodiment, the output unit may be configured to, in response to changing the target route of the vehicle, output a representative value for each second distance interval that is longer than the first distance interval as the road information. In this case, the vehicle control apparatus can leave the information useful for the vehicle control as the road information, and thus, it is possible to reduce the communication volume of the road information compared to the case where road information is thinned out at a fixed distance interval.

In the embodiment, the output unit may be configured to, in response to acquiring the thinned-out road information, output the road information on a location at the predetermined distance ahead on the target route from the position of the vehicle on the map acquired by the position acquisition unit. The buffer unit may be configured to store the road information in the storage unit every time the vehicle travels the first distance interval. In this case, since the vehicle control apparatus needs to communicate only for the road information on the location at predetermined distance ahead, it is possible to reduce the communication volume of the road information output at one time compared to the case where the road information to the predetermined distance ahead are communicated at one time.

According to various aspects of the present disclosure, it is possible to accurately control the speed of the vehicle in accordance with the road environment even if the target route of the vehicle is changed.

DETAILED DESCRIPTION

Exemplary embodiments will be described with reference to the drawings. In the description below, the same reference signs will be given to the same or equivalent elements and the descriptions thereof will not be repeated.

Configuration of Vehicle

Figure 1:
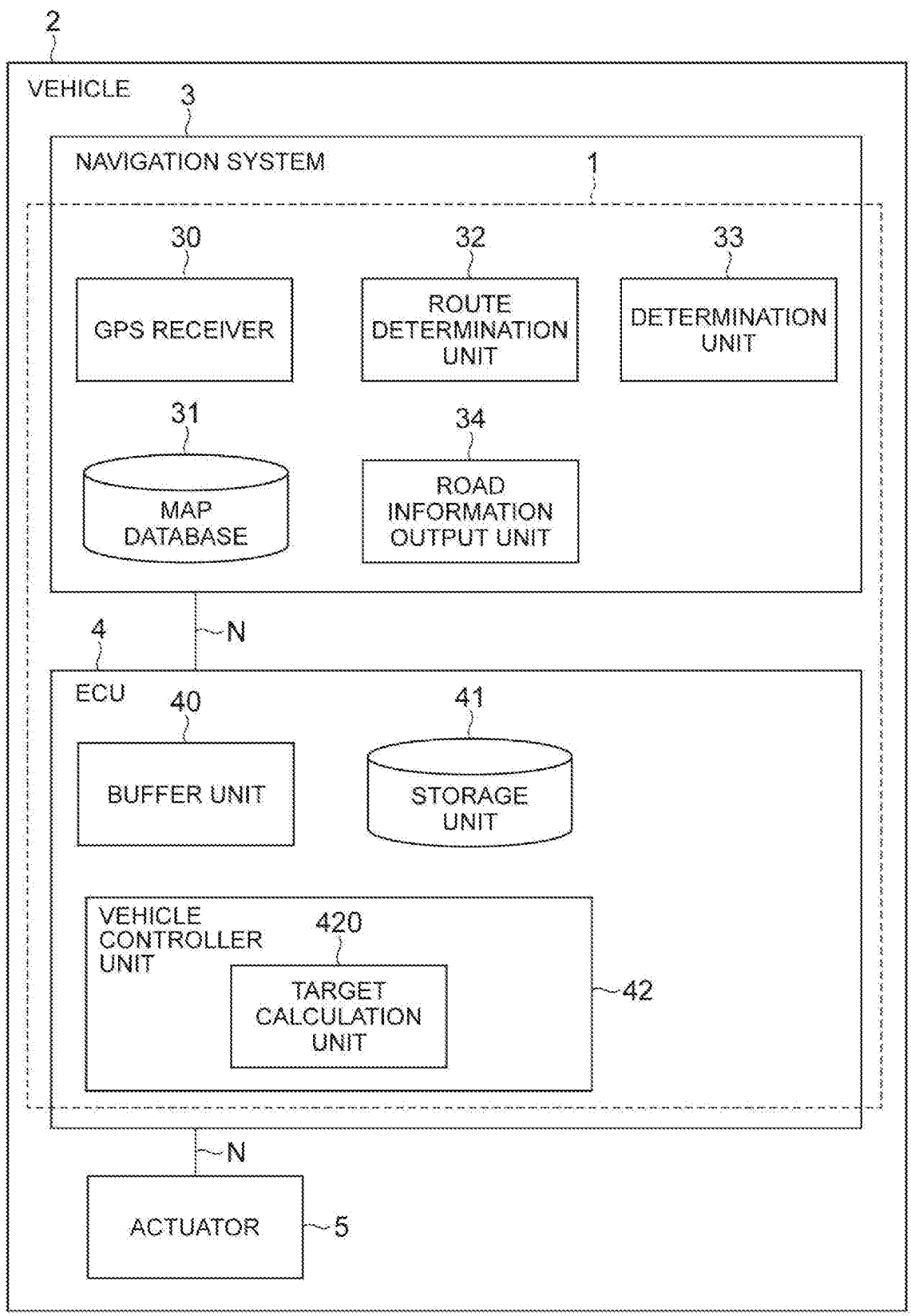
FIG. 1 is a block diagram illustrating an example of a configuration of a vehicle equipped with a vehicle control apparatus in the embodiments.

FIG. 1 is a block diagram illustrating an example of a configuration of a vehicle 2 equipped with a vehicle control apparatus 1 in the embodiments. As illustrated in FIG. 1, the vehicle 2 such as a passenger car includes a navigation system 3, an Electronic Control Unit (ECU) 4 (an example of a control unit), and an actuator 5. The vehicle control apparatus 1 is an apparatus that controls a speed of the vehicle 2 traveling along a target route. As an example, the vehicle control apparatus 1 is an apparatus that acquires information on a curve ahead of the vehicle 2 and performs speed adjustment in advance in order to prevent an excessive speed during the curve traveling.

The vehicle control apparatus 1 includes the navigation system 3 and the ECU 4. The navigation system 3, the ECU 4, and the actuator 5 are connected to the in-vehicle network N and are configured to enable the information communication. The in-vehicle network N is, for example, a controller area network (CAN). The navigation system 3 outputs the road information ahead of the vehicle 2 to the ECU 4 via the in-vehicle network N based on the target route. The ECU 4 controls the speed of the vehicle 2 by controlling the actuator 5 based on the acquired road information.

The navigation system 3 is a device that guides the information on driving. The navigation system 3 guides the target route as an example. As hardware for realizing the functions, the navigation system 3 includes processing devices such as an input output unit, a display unit, and a Central Processing Unit (CPU), storage devices such as Read Only Memory (ROM), Random Access Memory (RAM), and a Hard Disk Drive (HDD), and a communication device such as a Controller Area Network (CAN) communication circuit.

As an example, The navigation system 3 includes a GPS receiver 30 (an example of a position acquisition unit), a map database 31, a route determination unit 32, a determination unit 33, and a road information output unit 34.

The GPS receiver 30 is a measuring device that measures the position of the vehicle 2 on the map. The GPS receiver 30 measures, for example, the latitude and longitude of the vehicle 2 by receiving signals from three or more GPS satellites.

The map database 31 is a map including the road information. The map database 31 is stored in the HDD of the navigation system 3, for example. The road information is information on the road associated with the position on the map. The road information includes road shape information (road types such as a curve or a straight line, and a curve radius and a curve's curvature). In addition, the road information may be information converted based on the road shape information. For example, the road information may be the maximum speed of vehicle 2 determined based on the curve radius. The road information may include position information on an intersections and branch locations. In addition, the road information may include a traffic rule associated with the position information on the map. The traffic rules include a limited speed, a limited acceleration, and the like.

The route determination unit 32 determines the target route of the vehicle 2 based on the road information and the position of the vehicle 2 on the map acquired by the GPS receiver 30. The function of the route determination unit 32 is realized, for example, by the CPU included in the navigation system 3 accessing the storage device and executing the program stored in the storage device, or operating the communication circuit.

When a destination is set by the driver, the route determination unit 32 may determine the target route of the vehicle 2 based on the destination set by the driver, the current position of the vehicle 2, and the map information. When the destination is not set by the driver, the navigation system 3 may determine the target route of vehicle 2 by assuming that the vehicle 2 maintains the lane in which the vehicle 2 is currently traveling based on the current position of vehicle 2 and map information.

The determination unit 33 determines whether or not the target route is changed. The function of the determination unit 33 is realized, for example, by the CPU included in the navigation system 3 accessing the storage device and executing the program stored in the storage device, or operating a communication circuit.

The determination unit 33 determines whether or not the target route is changed after the target route has once set. As an example, when it is determined that the vehicle 2 has changed the lane based on a transition of the current position of the vehicle 2, the determination unit 33 determines that the target route is changed. When the destination is changed based on the input operation by the driver, the determination unit 33 may determine that the target route is changed. The determination unit 33 may determine that the target route is changed based on a comparison with the previous route. The determination result by the determination unit 33 is used by the road information output unit 34.

The road information output unit 34 outputs to the ECU 4 via the in-vehicle network N the road information on the plurality of locations from the position of the vehicle 2 on the map acquired by the GPS receiver 30 to a location at predetermined distance ahead on the target route. The function of the road information output unit 34 is realized, for example, by the CPU included in the navigation system 3 accessing the storage device and executing the program stored in the storage device, or operating the communication circuit.

The "predetermined distance" is a distance determined in advance. The predetermined distance is set, for example, according to the pre-read distance necessary for the speed control performed by the ECU 4. For example, when the ECU 4 uses the information to 400 m ahead of the vehicle 2 for the speed control, the predetermined distance is set as 400 m. The predetermined distance does not need to be the same as the pre-read distance but may be longer or shorter than the pre-read distance.

A location at predetermined distance ahead from the position of vehicle 2 changes as the vehicle 2 travels. Specifically, when the vehicle 2 advances 10 m, the "location at predetermined distance ahead" is a location 10 m further ahead from the "location at predetermined distance ahead" before the vehicle 2 advances. The road information output unit 34 updates the location at predetermined distance ahead along with the traveling of the vehicle 2, and outputs the road information to the ECU 4 via the in-vehicle network N based on the updated location at predetermined distance ahead. The road information output unit 34 may output the road information when the road information is not output even one time within a predetermined time.

In accordance with the determination result by the determination unit 33, the road information output unit 34 determines the road information to be transmitted among the road information to the location at the predetermined distance ahead on the target route. Specifically, the road information output unit 34 changes the road information to be transmitted in the period during which the target route is maintained and the period from the timing when the target route is changed to the timing when the predetermined condition is satisfied. Details of the road information to be transmitted will be described later. Hereinafter, the road information to be transmitted in the period during which the target route is maintained is referred to as first road information, and a transmission mode in which the first road information is transmitted is referred to as a first transmission mode. In addition, the road information to be transmitted during the period from the timing when the target route is changed to the timing when the predetermined condition is satisfied is referred to as second road information and the transmission mode in which the second road information is transmitted is referred to as a second transmission mode. The road information output unit 34 outputs the road information to which the information on the type of transmission mode is given, to the ECU 4.

The ECU 4 is a control device that controls the speed of the vehicle 2. The ECU 4 is an electronic control unit including the central processing unit (CPU), the read only memory (ROM), the random access memory (RAM), and the controller area network (CAN) communication circuit.

The ECU 4 includes a buffer unit 40, a storage unit 41, and a vehicle controller unit 42 (an example of a controller unit). The buffer unit 40 acquires the road information output by the road information output unit 34 of the navigation system 3 via communication, and stores the information in the storage unit 41 as road information. The function of the buffer unit 40 is realized, for example, by the CPU included in the ECU 4 accessing the storage device and executing the program stored in the storage device, or operating the communication circuit.

Figure 2:
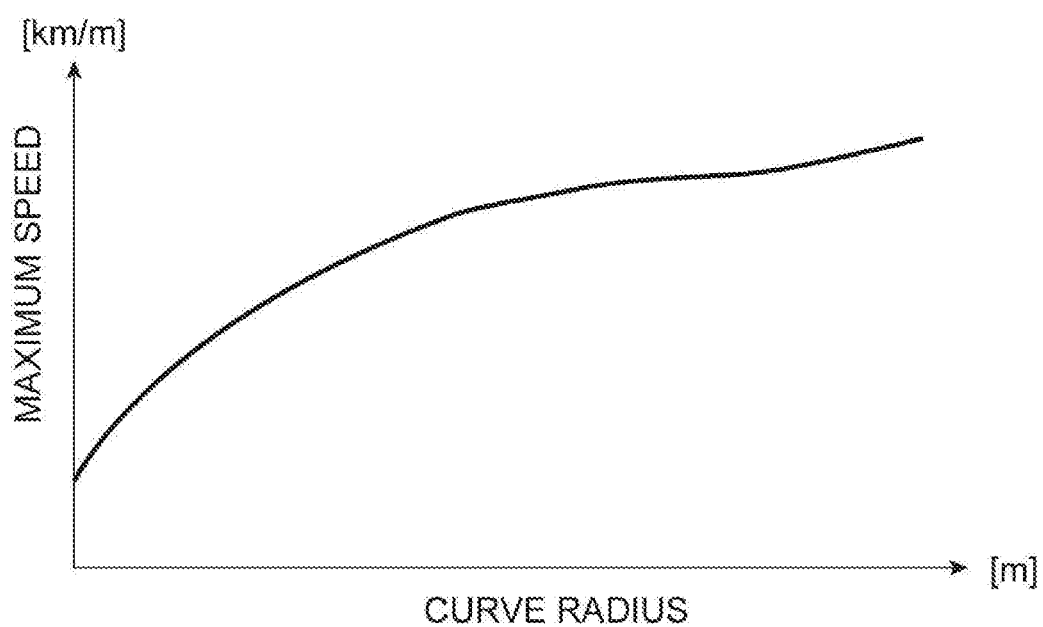
FIG. 2 is a graph illustrating an example of a relationship between a curve radius and a maximum speed.

The buffer unit 40 may store the maximum speed of the vehicle 2 determined based on the road shape as the road information. The maximum speed of vehicle 2 determined based on the road shape is the maximum value of the speed at which the vehicle 2 can travel without deviating from the road having the road shape. When road information output unit 34 outputs the curve radius to ECU 4, the buffer unit 40 converts the acquired curve radius into the maximum speed referring to a predetermined relationship between, for example, the curve radius and the maximum speed. The predetermined relationship between the curve radius and the maximum speed is stored in the storage area of the ECU 4, for example. FIG. 2 is a graph illustrating an example of the relationship between the curve radius and the maximum speed. The horizontal axis represents the curve radius and the vertical axis represents the maximum speed. As illustrated in FIG. 2, the maximum speed increases as the curve radius increases. In addition, the increase rate of the maximum speed becomes lower as the curve radius increases. The buffer unit 40 acquires the maximum speed referring to the graph illustrated in FIG. 2, and stores the maximum speed associated with the position in the storage unit 41.

The buffer unit 40 changes the storage method in the storage unit 41 according to the information on the type of transmission mode given to the road information. Details of the storage method by the buffer unit 40 will be described later.

The storage unit 41 is a memory for temporarily storing the road information.

The vehicle controller unit 42 controls the speed of the vehicle 2 based on the information stored in the storage unit 41. The function of the vehicle controller unit 42 is realized, for example, by a CPU included in the ECU 4 accessing the storage device and executing a program stored in the storage device, or operating a communication circuit.

The vehicle controller unit 42 includes a target calculation unit 420. Based on the road information stored in the storage unit 41, the target calculation unit 420 calculates an acceleration or deceleration for realizing the vehicle speed corresponding to the road shape. The calculation of the acceleration or deceleration will be described later in detail. The vehicle controller unit 42 outputs an operation signal to the actuator 5 based on the acceleration or deceleration calculated by the target calculation unit 420.

The actuator 5 is a device used for controlling the vehicle 2. The actuator 5 includes at least a throttle actuator and a brake actuator.

The throttle actuator controls a driving force of the vehicle 2 by controlling an amount of air (throttle opening degree) supplied to the engine according to the control signal from the ECU 4. If the vehicle 2 is a hybrid vehicle, in addition to the amount of air supplied to the engine, a control signal from the ECU 4 is input to a motor as a power source, and the driving force of the vehicle 2 is controlled.

If the vehicle 2 is an electric vehicle, a control signal from the ECU 4 is input to a motor (motor functioning as an engine) as a power source, and the driving force of the vehicle 2 is controlled. The motor as the power source in these cases configures the actuator 5.

The brake actuator controls the brake system according to the control signal from the ECU 4 and controls a braking force applied to the wheels of the vehicle 2. For example, a hydraulic brake system can be used as the brake system. The actuator 5 may include a steering actuator.

First Transmission Mode

The road information (the first road information) to be transmitted in the period during which the target route is maintained, and the road information stored in the storage unit 41 will be described in detail.

When the target route is maintained, the road information output unit 34 of the navigation system 3 outputs the road information on the plurality of locations from the position of the vehicle 2 on the map acquired by the GPS receiver 30 to the location at the predetermined distance ahead on the target route. That is, the road information output unit 34 outputs the road information on a certain location at predetermined distance ahead of the target route when the target route is maintained. The road information output unit 34 gives an identifier of the first transmission mode to the road information, and then, outputs the information.

When the identifier of the first transmission mode is given to the road information output by the road information output unit 34 of the navigation system 3, the buffer unit 40 of the ECU 4 stores the information in a first storage mode. The buffer unit 40 stores the acquired road information in the storage unit 41 as road information on a first distance interval. The buffer unit 40 stores the road information in the storage unit 41 every time the vehicle 2 travels on the first distance interval. The buffer unit 40 sequentially acquires the road information on the certain location at predetermined distance ahead, discards the road information not corresponding to the first distance interval, and stores only the road information on the first distance interval in the storage unit 41. The "first distance interval" is a predetermined distance. The first distance interval is set as a distance interval necessary for the speed control performed by the ECU 4. The first distance interval is, for example, a 5 m interval.

FIG. 3A to FIG. 3D are diagrams explaining examples of the road information stored in the storage unit 41. In FIG. 3A to FIG. 3D, the road information output unit 34 outputs the road information on a location at 400 m ahead, for example. The buffer unit 40 stores the road information at a 5 m interval as an example. The vehicle 2 is traveling in a lane 60 along the target route 61. The states in FIG. 3A to FIG. 3D sequentially shift in a time series order.

Figure 3:
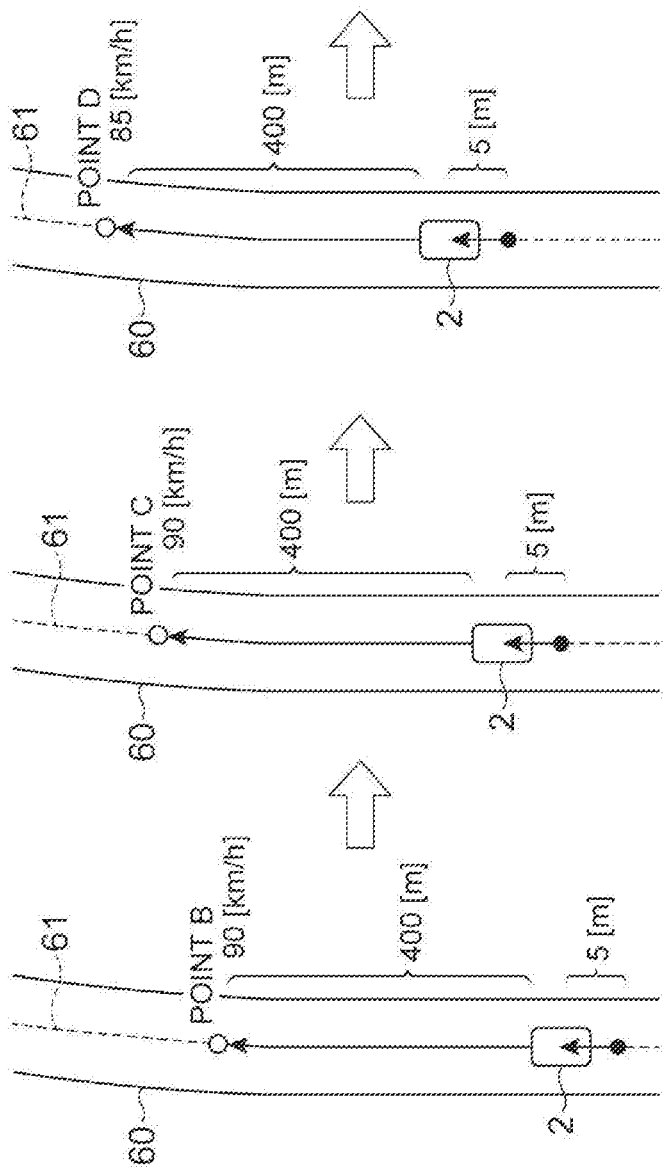
FIG. 3A is diagram explaining examples of road information stored in a storage unit.
FIG. 3B is diagram explaining examples of road information stored in a storage unit.
FIG. 3C is diagram explaining examples of road information stored in a storage unit.
FIG. 3D is diagram explaining examples of road information stored in a storage unit.

The state in FIG. 3A is a buffering start state. The road information output unit 34 of the navigation system 3 outputs the curve radius at the location A at 400 m ahead of the vehicle 2 to the ECU 4 together with the identifier of the first transmission mode. The buffer unit 40 of the ECU 4 determines that the mode is the first transmission mode and converts the curve radius into the maximum speed (100 km/h) referring to the graph in FIG. 2. The buffer unit 40 stores the position of the location A and the maximum speed (100 km/h) in the storage unit 41 in association with each other.

The state in FIG. 3B is a state in which the vehicle 2 advances 5 m from the state in FIG. 3A. The road information output unit 34 of the navigation system 3 outputs the curve radius at the location B at 400 m ahead of the vehicle 2 to the ECU 4 together with the identifier of the first transmission mode. The buffer unit 40 of the ECU 4 determines that the mode is the first transmission mode and converts the curve radius into the maximum speed (90 km/h) referring to the graph in FIG. 2. The buffer unit 40 stores the position of the location B and the maximum speed (90 km/h) in the storage unit 41 in association with each other.

The state in FIG. 3C is a state in which the vehicle 2 advances 5 m from the state in FIG. 3B. The road information output unit 34 of the navigation system 3 outputs the curve radius at the location C at 400 m ahead of the vehicle 2 to the ECU 4 together with the identifier of the first transmission mode. The buffer unit 40 of the ECU 4 determines that the mode is the first transmission mode and converts the curve radius into the maximum speed (90 km/h) referring to the graph in FIG. 2. The buffer unit 40 stores the position of the location C and the maximum speed (90 km/h) in the storage unit 41 in association with each other.

The state in FIG. 3D is a state in which the vehicle 2 advances 5 m from the state in FIG. 3C. The road information output unit 34 of the navigation system 3 outputs the curve radius at the location D at 400 m ahead of the vehicle 2 to the ECU 4 together with the identifier of the first transmission mode. The buffer unit 40 of the ECU 4 determines that the mode is the first transmission mode and converts the curve radius into the maximum speed (85 km/h) referring to the graph in FIG. 2. The buffer unit 40 stores the position of the location D and the maximum speed (85 km/h) in the storage unit 41 in association with each other.

As described above, in the first transmission mode, the road information output unit 34 of the navigation system 3 sequentially outputs the road information to the ECU 4. When the vehicle 2 advances equal to or more than 5 m from the location where the maximum speed is stored in the storage unit 41, the buffer unit 40 of the ECU 4 stores the maximum speed in the storage unit 41 based on the road information received at that position. The buffer unit 40 discards the road information received at other positions. By repeating the above-described processing, when the vehicle 2 advances predetermined distance (400 m), all the road information to the locations at a predetermined distance ahead (400 m ahead) are stored in the storage unit 41. When the vehicle 2 advances 5 m, the road information to the locations at predetermined distance ahead (400 m ahead) are updated.

Figure 4:
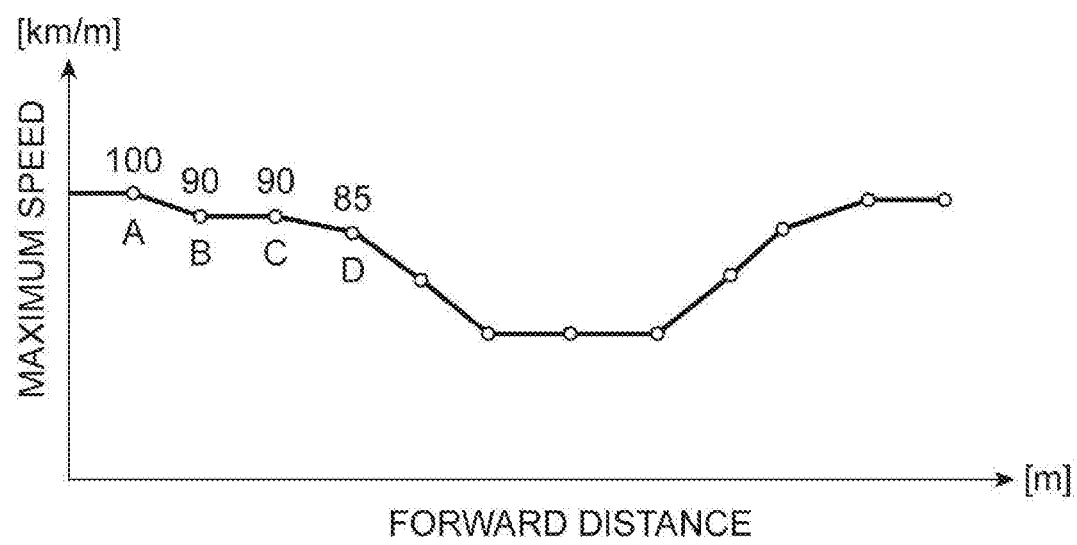
FIG. 4 is a graph illustrating an example of a relationship between a forward distance and the maximum speed.

The information stored in the storage unit 41 are graphed as a graph illustrated in FIG. 4. FIG. 4 is a graph illustrating an example of a relationship between a forward distance and the maximum speed. The horizontal axis represents the forward distance and the vertical axis represents the maximum speed. The graph illustrates the locations from the location A to the location D. The relationship between the forward distance and the maximum speed can be obtained by connecting the data locations at each location with a straight line. The target calculation unit 420 calculates the acceleration or deceleration of the vehicle 2 at each location such that the vehicle speed at each location becomes equal to or lower than the maximum speed. The target calculation unit 420 can calculate the acceleration or deceleration using, for example, a well-known vehicle model.

Second Transmission Mode

Hereinafter, details of the road information to be transmitted during the period from the timing when the target route is changed to the timing when the predetermined condition is satisfied (second road information) and the road information stored in the storage unit 41 will be described.

Figure 5:
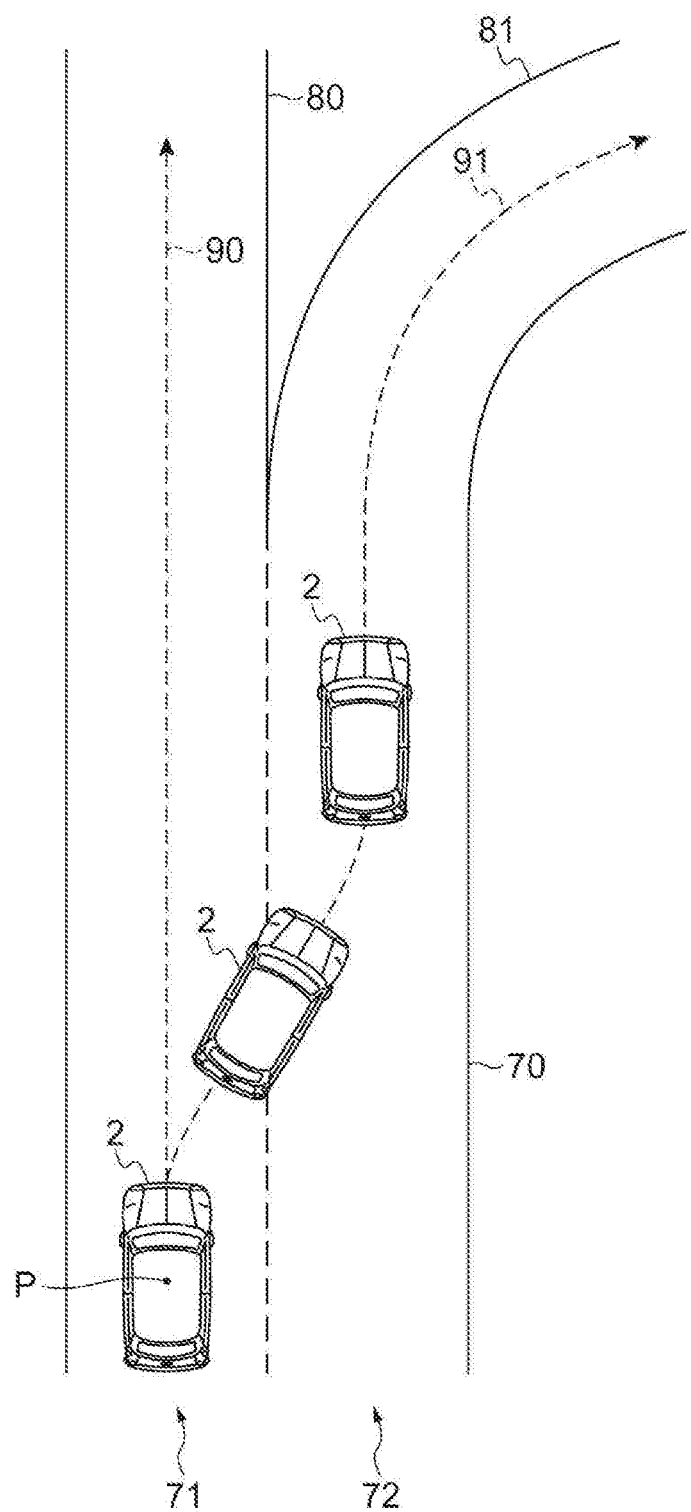
FIG. 5 is a diagram explaining an example of a route change.

FIG. 5 is a diagram explaining an example of a route change. FIG. 5 illustrates a road environment having a branch. A road 70 has a first lane 71 and a second lane 72. The first lane 71 is a lane of the first road 80 after branching. The second lane 72 is a lane of the second road 81 after branching. The vehicle 2 is traveling in the first lane 71 along the first target route 90. The current position is a position P, that is, for example, the position of the center of gravity of the vehicle 2. Here, it is assumed that the target route of the vehicle 2 is changed from the first target route 90 to the second target route 91 by an operation by the driver or the like. In this case, since the road information on the location at predetermined distance ahead is also changed, it is necessary to acquire again the road information on the locations from the current position to the location predetermined distance ahead. Therefore, the transmission mode is changed from the first transmission mode to the second transmission mode.

When the target route is changed from the first target route 90 to the second target route 91, the road information output unit 34 of the navigation system 3 thins out the road information on the locations from the position P of the vehicle 2 on the map acquired by the GPS receiver 30 to the location at the predetermined distance ahead on the second target route 91 such that the number of data becomes less than that of the road information on the first distance interval.

The road information output unit 34 can thin out the road information from the position P to the location at the predetermined distance ahead in various methods. As an example, the road information output unit 34 outputs a representative value for each second distance interval that is longer than the first distance interval as the road information. That is, the road information output unit 34 may thin out the data so as to be a set of data of the second distance interval. For example, when the predetermined distance is 400 m ahead and the first distance interval is 5 m, the data are thinned out in such a manner that the number of data in the set of data from the position P to 400 m ahead becomes the set of data of 20 m interval. Alternatively, the road information output unit 34 may calculate a representative value in the second distance interval and delete data other than the representative value. The representative value is the most representative data of the characteristics of the section, and the values are the minimum value of the curve radius or the maximum speed within the section, and the maximum value of the curve's curvature within the section.

The road information output unit 34 gives an identifier of the second transmission mode to the road information and then, outputs the information. The road information output unit 34 may transmit the road information on the plurality of locations from the position P to the location at the predetermined distance ahead all at once, or may transmit the road information multiple times. For example, when the set of data of the locations from the position P to the location at 400 m ahead, in the first transmission, the road information output unit 34 transmits the road information (may be the representative value) on the locations between zero to 40 m ahead. In the second transmission, the road information output unit 34 transmits the road information (may be the representative value) on the locations between 40 to 80 m ahead. By repeating this processing, transmission of set of data from the position P to 400 m ahead is completed at the tenth transmission.

When the thinned-out road information are acquired, that is, When the road information to which the identifier of the second transmission mode is given are received, the buffer unit 40 of the ECU 4 erases the storage contents stored in the storage unit 41, and stores the thinned-out road information in the storage unit 41. In this way, the road information on the first target route 90 is reset and the road information on the second target route 91 is stored in the storage unit 41.

Figure 6A:
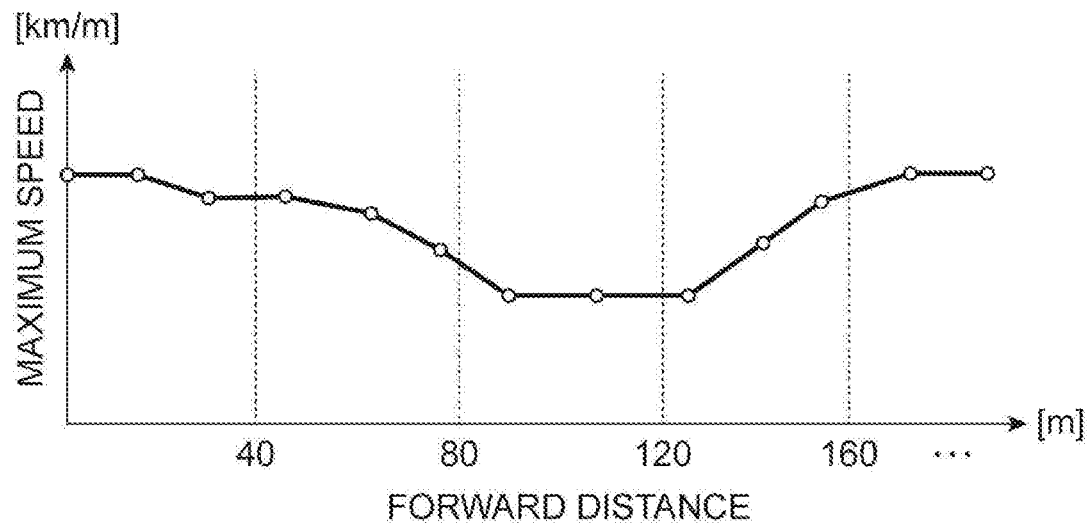
FIG. 6A is diagram explaining an example of thinning out data locations.
Figure 6B:
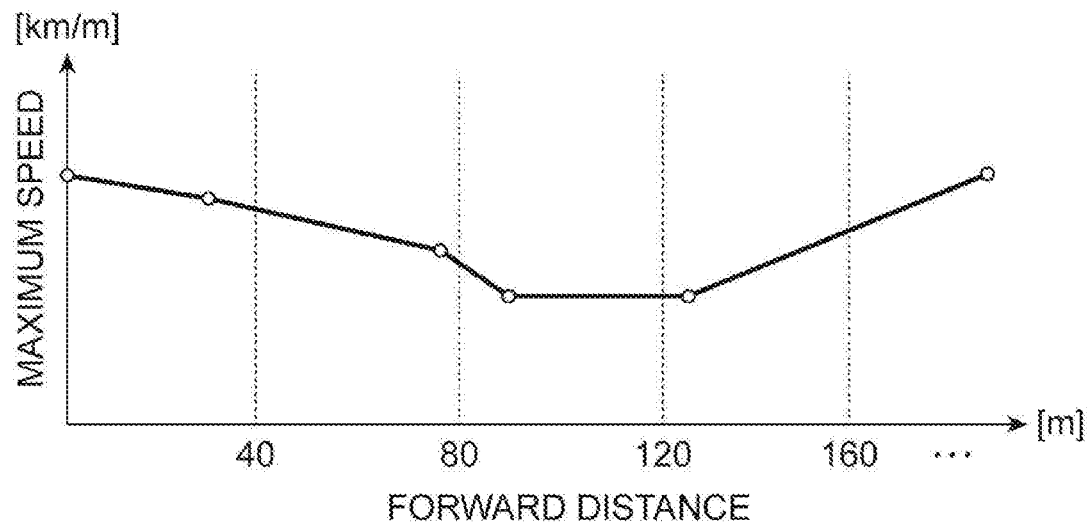
FIG. 6B is diagram explaining an example of thinning out data locations.

The data stored in the storage unit 41 will be described. FIG. 6A and FIG. 6B are diagrams explaining an example of thinning out the data locations. FIG. 6A is a graph illustrating a relationship between the forward distance and the maximum speed stored in the first transmission mode based on the road information transmitted. The horizontal axis represents the forward distance and the vertical axis represents the maximum speed. FIG. 6B is a graph illustrating a relationship between the forward distance and the maximum speed stored based on the road information transmitted in the second transmission mode. The horizontal axis represents the forward distance and the vertical axis represents the maximum speed. In the second transmission mode, the representative value is transmitted as an example. The graph in FIG. 6B is obtained by thinning out the data locations from those in the graph in FIG. 6A. The patterns obtained by connecting each data location by a straight line are similar to each other. Therefore, even after thinning out, the target calculation unit 420 can calculate the acceleration or deceleration necessary for the vehicle control without greatly lowering the accuracy.

When a predetermined condition is satisfied, the road information output unit 34 ends the transmission in the second transmission mode and returns to the transmission in the first transmission mode. The predetermined condition is, for example, when the transmission of the data of the location at predetermined distance ahead is completed by the transmission in the second transmission mode. After the transmission in the second transmission mode is completed, whether or not the route change is performed is determined with the second target route 91 as a reference.

Outline of Operation of Vehicle Control Apparatus

Figure 7:
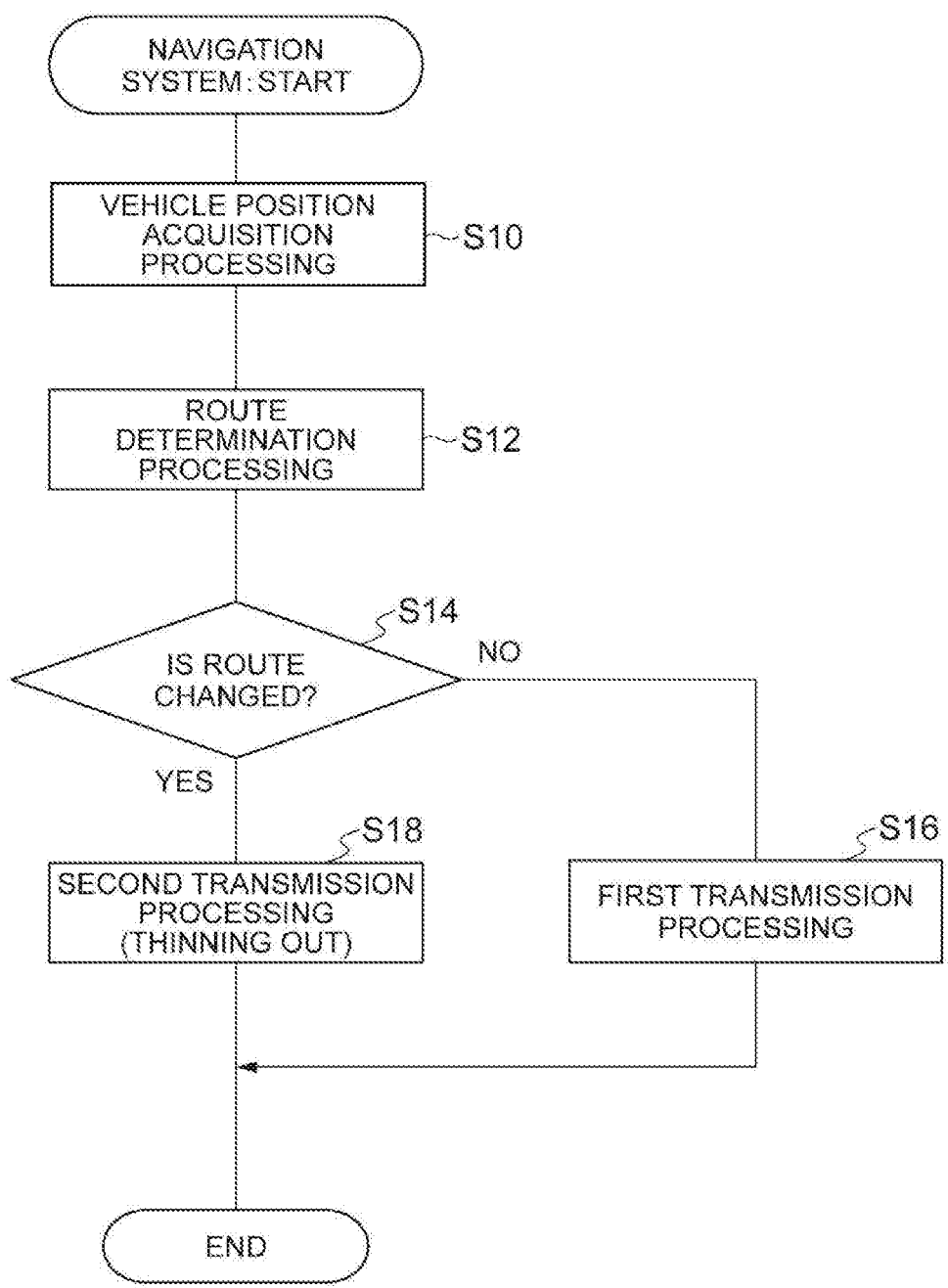
FIG. 7 is a flowchart illustrating an example of output processing by the navigation system.

Hereinafter, an example of a vehicle control method will be disclosed. FIG. 7 is a flowchart illustrating an example of output processing by the navigation system 3. The processing in the flowchart in FIG. 7 is performed by the navigation system 3 of the vehicle control apparatus 1, for example, at the timing when an ON operation for the vehicle control by the driver of the vehicle 2 is received.

As illustrated in FIG. 7, the GPS receiver 30 of the navigation system 3 acquires the position of the vehicle 2 on the map as vehicle position acquisition processing (S10). Subsequently, the route determination unit 32 of the navigation system 3 determines the target route of the vehicle 2 as route determination processing (S12). The route determination unit 32 determines the target route of the vehicle 2 based on the road information and the position of the vehicle 2 on the map acquired in the vehicle position acquisition processing (S10).

Subsequently, the determination unit 33 of the navigation system 3 determines whether or not the target route is changed as a determination processing (S14). The determination unit 33 determines whether or not the vehicle 2 changes the lanes based on the transition of the current position of the vehicle 2 as an example. When it is determined that the vehicle 2 changes the lanes, the determination unit 33 determines that the target route is changed.

When it is determined that the target route is not changed (NO in S14), the road information output unit 34 of the navigation system 3 transmits the road information in the first transmission mode as first transmission processing (S16). The road information output unit 34 outputs the road information on the plurality of locations from the position of the vehicle 2 on the map acquired by the GPS receiver 30 to the location at the predetermined distance ahead on the target route.

When it is determined that the target route is changed (YES in S14), the road information output unit 34 of the navigation system 3 transmits the road information in the second transmission mode as second transmission processing (S18). The road information output unit 34 outputs the road information on the plurality of locations from the position P of the vehicle 2 on the map acquired by the GPS receiver 30 to the location at the predetermined distance ahead on the second target route 91 by thinning out the road information such that the number of data becomes less than that of the road information on the first distance interval.

When either one of the first transmission processing (S16) and the second transmission processing (S18) end, the navigation system 3 ends the processing in the flowchart illustrated in FIG. 7. The navigation system 3 performs the processing again shown in the flowchart illustrated in FIG. 7 until the vehicle control is canceled. By performing the processing in the flowchart illustrated in FIG. 7, the road information having different data capacity depending on the route change is transmitted.

Figure 8:
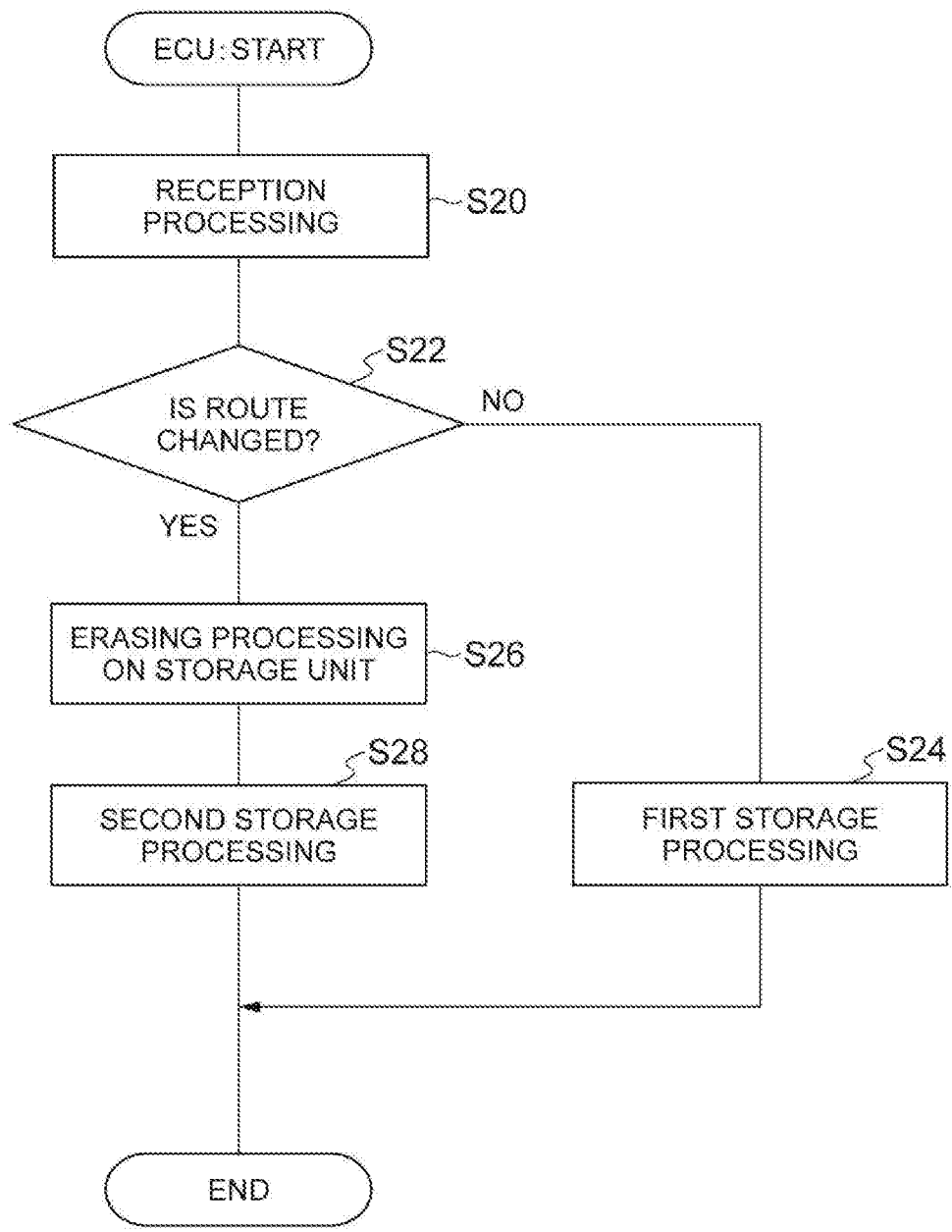
FIG. 8 is a flowchart illustrating an example of storage processing by an ECU.

FIG. 8 is a flowchart illustrating an example of the storage processing by the ECU 4. The processing in the flowchart in FIG. 8 is performed by the ECU 4 of the vehicle control apparatus 1, for example, at the timing when an ON operation for the vehicle control by the driver of the vehicle 2 is received. The processing in the flowchart in FIG. 8 can be performed in parallel with the processing in the flowchart in FIG. 7.

As illustrated in FIG. 8, the buffer unit 40 of the ECU 4 receives the road information from the navigation system 3 as reception processing (S20). Subsequently, the buffer unit 40 determines whether or not the target route is changed as the determination processing (S22). The buffer unit 40 determines whether or not the target route is changed based on the identifier of the transmission mode given to the road information received in the reception processing (S20). When the identifier indicates the first transmission mode, the buffer unit 40 determines that the target route is not changed. When the identifier indicates the second transmission mode, the buffer unit 40 determines that the target route is changed.

When the target route is not changed (NO in S22), the buffer unit 40 stores the road information in the storage unit 41 as first storage processing (S24) based on the road information received in the reception processing (S20). As an example, when the vehicle 2 advances equal to or more than 5 m from the location where the road information is stored in the storage unit 41, the buffer unit 40 stores the road information received in the reception processing (S20) in the storage unit 41. The buffer unit 40 discards the road information received at other positions.

When the target route is changed (YES in S22), the buffer unit 40 erases the storage contents stored in the storage unit 41 as erasing processing (S26). As the second storage processing (S28), the buffer unit 40 stores the road information received in the reception processing (S20), that is, the thinned-out road information, in the storage unit 41 as it is. When the navigation system 3 transmits the road information multiple times, the buffer unit 40 receives all of the divided road information as the second storage processing (S28).

When either one of the first storage processing (S24) or the second storage processing (S28) ends, the ECU 4 ends the processing in the flowchart illustrated in FIG. 8. The ECU 4 performs the processing again shown in the flowchart illustrated in FIG. 8 until the vehicle control is canceled. By performing the processing in the flowchart illustrated in FIG. 8, the road information having different data capacity depending on the route change is stored in the storage unit 41.

Figure 9:
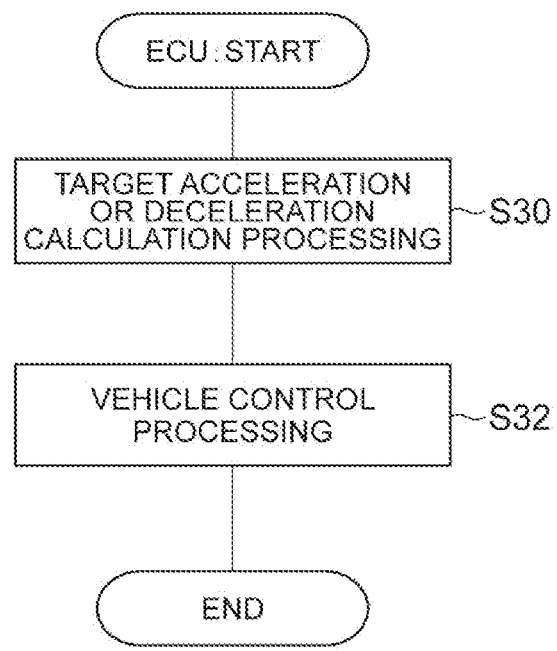
FIG. 9 is a flowchart illustrating an example of vehicle control processing by the ECU.

FIG. 9 is a flowchart illustrating an example of the vehicle control processing by the ECU 4. The processing in the flowchart in FIG. 9 is performed by the ECU 4 of the vehicle control apparatus 1, for example, at the timing when the ON operation for the vehicle control by the driver of the vehicle 2 is received. The processing in the flowchart in FIG. 9 can be performed in parallel with the processing in the flowchart in FIG. 7 and FIG. 8.

As illustrated in FIG. 9, as the target acceleration or deceleration calculation processing (S30), the target calculation unit 420 of the ECU 4 calculates the acceleration or deceleration of the vehicle 2 at each location to a predetermined distance ahead of the vehicle 2 using the information (for example, FIG. 4 and FIGS. 6A and 6B) stored in the storage unit 41 such that the vehicle speed at each location becomes equal to or lower than the maximum speed. The target calculation unit 420 can calculate the acceleration or deceleration using, for example, a well-known vehicle model.

Subsequently, as the vehicle control processing (S32), the vehicle controller unit 42 of the ECU 4 outputs a control signal to the actuator 5 such that the acceleration or deceleration becomes the acceleration or deceleration calculated in the target acceleration or deceleration calculation processing (S30).

When the vehicle control processing (S32) ends, the ECU 4 ends the processing in the flowchart illustrated in FIG. 9. The ECU 4 performs the processing again shown in the flowchart illustrated in FIG. 9 until the vehicle control is canceled. By performing the flowchart illustrated in FIG. 9, the speed of the vehicle 2 is controlled such that the vehicle 2 does not deviate from the lane.

Summary of Embodiment

As described above, in the vehicle control apparatus 1, when the first target route 90 of the vehicle 2 is changed to the second target route 91, the road information on the plurality of locations from the position of vehicle 2 on the map to the location at 400 m ahead (an example of a location at the predetermined distance ahead) on the second target route 91 (an example of the changed target route) are thinned out such that the number of data becomes less than that of the road information on 5 m interval (an example of the first distance interval) and the result are output by the road information output unit 34 (an example of the output unit). That is, the vehicle control apparatus 1 can quickly acquire the road information after the change of the target route by reducing the communication volume for the transmission when the target route is changed. Accordingly, even if the target route of the vehicle 2 is changed, the vehicle control apparatus 1 can accurately control the speed of the vehicle 2 in accordance with the road environment.

In addition, in the vehicle control apparatus 1, when the target route of the vehicle 2 is changed, the road information output unit 34 outputs the minimum value (an example of the representative value) of the curve radius for each of 20 m interval (an example of the second distance interval) that is longer than 5 m interval (an example of the first distance interval) as the thinned-out road information. In this case, the vehicle control apparatus 1 can leave the information useful for the vehicle control as the road information, and thus, it is possible to reduce the communication volume of the road information compared to the case where road information is thinned out at a fixed distance interval.

In addition, in the vehicle control apparatus 1, the road information output unit 34 outputs the curve radii (an example of the road information) at the locations from the position of the vehicle 2 on the map acquired by the GPS receiver 30 to the location 400 m ahead (an example of the predetermined distance ahead) on the target route. Then, the buffer unit 40 stores the maximum speed (an example of the road information) in the storage unit 41 every time the vehicle 2 travels the first distance interval. In this case, since the vehicle control apparatus 1 needs to communicate only for the road information on the location at predetermined distance ahead, it is possible to reduce the communication volume of the road information output at one time compared to the case where the road information to the location at the predetermined distance ahead are communicated at one time.

The embodiment described above can be implemented in various forms in which various modifications and improvements are made based on the knowledge of those skilled in the art.

For example, the function of the ECU 4 does not need to be realized by one control unit. That is, a plurality of ECUs may realize the function of the ECU 4. In addition, the functions of the route determination unit 32, the determination unit 33, and the road information output unit 34 of the navigation system 3 may be realized outside of the navigation system 3. For example, the ECU 4 may have the functions of the route determination unit 32, the determination unit 33, and the road information output unit 34. In addition, the road information output unit 34 may include the function of the determination unit 33.

What is claimed is:

1. A vehicle control apparatus comprising:
a navigation system; and
an electronic control unit (ECU), including at least one processor, programmed to communicably connect to the navigation system,
wherein the navigation system includes:
a map database including a map and a curve radius corresponding to positions on a road,
a global positioning system (GPS) configured to acquire a position of a vehicle on the map,
a processor programmed to:
determine a target route of the vehicle based on the map and the position of the vehicle on the map acquired by the GPS,
output, to the ECU, the curve radius corresponding to positions on the target route, and
determine whether the target route is changed based on a lane change, after the target route has once set,
wherein the ECU is further programmed to:
acquire the curve radius corresponding to positions on the target route output by the navigation system,
convert the curve radius corresponding to positions on the target route into a maximum speed corresponding to the positions on the target route and store the maximum speed corresponding to the positions on the target route in a storage unit, and
control a speed of the vehicle based on the maximum speed corresponding to positions on the target route stored in the storage unit,
wherein the navigation system is configured to, in response to determining that the target route has not changed, output the curve radius corresponding to positions of a first distance interval, the positions being located at a predetermined distance ahead on the target route, and ECU is further programmed to convert the curve radius, corresponding to the positions of the first distance interval output by the navigation system, to the maximum speed and store the maximum speed in the storage unit, and
wherein the navigation system is configured to, in response to determining that the target route has changed, determine the curve radius corresponding to the positions of a second distance interval larger than the first distance interval among the curve radius corresponding to positions from the position of the vehicle on the map to a position at the predetermined distance ahead on the changed target route and output the determined curve radius, and the ECU is further programmed to erase the stored maximum speed corresponding to the positions related to the target route before changing, convert the curve radius corresponding to the positions of the second distance interval on the changed target route into the maximum speed, and store the maximum speed in the storage unit.

2. The vehicle control apparatus according to claim 1, wherein the navigation system is configured to output a representative value for each second distance interval as the curve radius corresponding to the positions of the second distance interval.

3. The vehicle control apparatus according to claim 1, wherein the ECU is programmed to, in response to determining the target route has not changed, store the maximum speed in the storage unit every time the vehicle travels the first distance interval.

4. A vehicle control apparatus comprising:
a navigation system; and
an electronic control unit (ECU), including at least one processor, programmed to communicably connect to the navigation system,
wherein the navigation system is configured to include:
a map database including a map, and data corresponding to positions on a road,
a global positioning system (GPS) configured to acquire a position of a vehicle on the map,
a processor programmed to:
determine a target route of the vehicle based on the map and the position of the vehicle on the map acquired by the GPS,
output, to the ECU, the data corresponding to positions on the target route, and
determine whether the target route is changed based on a lane change, after the target route has once set,
wherein the ECU includes a storage unit, and is further programmed to:
store the data corresponding to positions on the target route output by the navigation system, and
control a speed of the vehicle based on the data corresponding to positions on the target route stored in the storage unit,
wherein the navigation system is configured to, in response to determining the target route has not changed, output the data corresponding to positions of a first distance interval, the positions being located at a predetermined distance ahead on the target route, and the ECU is further programmed to store the data corresponding to the positions of the first distance interval output by the navigation system, and wherein the navigation system is configured to, in response to determining the target route has changed, determine the data corresponding to the positions of a second distance interval larger than the first distance interval among the data corresponding to positions from the position of the vehicle on the map to a position at the predetermined distance ahead on the changed target route and output the data, and the ECU is further programmed to erase the stored data corresponding to the positions related to the target route before changing, and store the data corresponding to the positions of the second distance interval on the changed target route in the storage unit.

* * * * *